United States Patent
McReynolds et al.

(10) Patent No.: US 6,404,596 B1
(45) Date of Patent: Jun. 11, 2002

(54) OVERMOLDING STIFFENING TECHNIQUE AND STRUCTURE

(75) Inventors: Dave Paul McReynolds, Loveland; Carl Douglas Hutchings, Longmont, both of CO (US)

(73) Assignee: Seagate Technology LLC, Scotts Valley, CA (US)

(*) Notice: Subject to any disclaimer, the term of this patent is extended or adjusted under 35 U.S.C. 154(b) by 15 days.

(21) Appl. No.: 09/689,473

(22) Filed: Oct. 12, 2000

Related U.S. Application Data

(60) Provisional application No. 60/181,025, filed on Feb. 8, 2000.

(51) Int. Cl.[7] .............................. G11B 5/54; G11B 21/12
(52) U.S. Cl. .................................................... 360/265.8
(58) Field of Search .......................... 360/264.7, 265, 360/265.7, 265.8

(56) References Cited

U.S. PATENT DOCUMENTS

| | | | |
|---|---|---|---|
| 5,600,516 A | 2/1997 | Phillips et al. | 360/265.1 |
| 5,650,896 A | 7/1997 | Viskochil | 360/265.7 |
| 5,715,117 A | 2/1998 | Brooks | 360/244.5 |
| 5,731,934 A | 3/1998 | Brooks et al. | 360/266.1 |
| 5,734,528 A | 3/1998 | Jabbari et al. | 360/265 |
| 5,818,667 A | 10/1998 | Larson | 360/264.2 |
| 5,835,308 A | 11/1998 | Hasegawa | 360/265.7 |
| 5,862,019 A | 1/1999 | Larson | 360/265.8 |
| 5,903,413 A | 5/1999 | Brooks et al. | 360/264.2 |
| 6,151,198 A * | 11/2000 | Prater et al. | 148/549 |

* cited by examiner

Primary Examiner—David L. Ometz
(74) Attorney, Agent, or Firm—Merchant & Gould P.C.

(57) ABSTRACT

The present invention is an apparatus and method for an improved actuator arm assembly in a disc drive. This invention results from the realization that structurally inferior actuator assemblies create low frequency, high amplitude resonances. This invention reduces resonances through the utilization of a voice coil motor overmolding technique that additionally incorporates a stiffening member to increase the rigidity of the actuator assembly.

15 Claims, 4 Drawing Sheets

OVERMOLDING STIFFENING TECHNIQUE AND STRUCTURE

CROSS REFERENCE TO RELATED APPLICATIONS

This application claims the benefit of priority of U.S. Provisional Patent Application Ser. No. 60/181,025, filed Feb. 8, 2000.

FIELD OF THE INVENTION

This application relates generally to disc drives and more particularly to an improvement in a disc drive actuator assemblies and voice coil motors. More specifically, the invention relates to an actuator body that uses a stiffener member that is overmolded with the voice coil motor, as well as a process for manufacturing the actuator assembly.

BACKGROUND OF THE INVENTION

Disc drives are data storage devices that store digital data in magnetic form on a rotating storage medium on a disc. Modern disc drives comprise one or more rigid discs that are typically coated with a magnetizable medium and mounted on the hub of a spin motor for rotation at a constant high speed. Information is stored on the discs in a plurality of concentric circular tracks typically by transducers ("heads") mounted to an actuator assembly for movement of the heads relative to the discs. During a write operation, data is written onto the disc track and during a read operation the head senses the data previously written on the disc track and transfers the information to the external environment.

The heads are each mounted via flexures at the ends of actuator arms that project radially outward from the actuator body or "E" block. The actuator body typically pivots about a shaft mounted to the disc drive housing adjacent the outer extreme of the discs. The pivot shaft is parallel to the axis of rotation of the spin motor and the discs, so that the heads move in a plane parallel to the surfaces of the discs.

Typically, such actuator assemblies employ a voice coil motor to position the heads with respect to the disc surfaces. The voice coil motor typically includes a flat coil mounted horizontally on the side of the actuator body opposite the actuator arms. The coil is immersed in a vertical magnetic field of a magnetic circuit comprising one or more permanent magnets and vertically spaced apart magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the voice coil moves, the actuator body pivots about the pivot portion and the heads move across the disc surfaces. The actuator assembly thus allows the head to move back and forth in an accurate fashion between an inner radius and an outer radius of the discs.

Critical to these operations is the accurate controlled movement of the recording head to and from desired data tracks and precision track following. It is essential that the actuator system be free of low frequency, high amplitude resonances. One common resonance inherent to all rotary actuators is a mode in which the voice coil tends to bend laterally about the pivot shaft due to the actuator body's mass moment and its relatively high inertia. This resonance affects the accuracy of head positioning, and therefore limits track density, an important problem in disc drie design. Currently, the voice coil is held in place using a plastic overmold material attached to the pivot portion of the actuator body for ease in design and manufacturing. However, the use of plastic is not always advantageous because it is structurally weak and it contributes to undesirable resonances.

Earlier actuator designs included a pair radially spaced aluminum fingers added to the actuator body radiating from the pivot portion. The voice coil was held in place between the fingers using an adhesive. However, adhesives, such as epoxy, are expensive and cause undesirable outgassing within the drive. The current, conventional overmold techniques and material eliminates epoxy and provides additional benefits of being able to incorporate complex latching and servo track features into the actuator design. The disadvantage is that the overmold introduces undesirable resonances as described above.

Accordingly there is a need for an actuator assembly that achieves the benefits of the overmolding techniques while at the same time minimizing undesirable resonances.

SUMMARY OF THE INVENTION

Against this backdrop the present invention has been developed. The present invention is an actuator assembly that includes an actuator body with stiffening members that are embedded within an overmold that attaches the voice coil motor armature to the pivot portion of the actuator body. Preferably a pair of spaced stiffening members extend from the pivot portion of the actuator body in a direction generally opposite of the actuator arm portion. The voice coil is carried between the stiffening members by enclosing the stiffening members and the voice coil.

The stiffening member in the overmold enhances the rigidity of the actuator body interface, minimizing low frequency, high amplitude resonances during drive operations. Additionally, by improving the rigidity of the actuator body and the voice coil motor armature, the accuracy of positioning the heads at the distal ends of the actuator arms is improved permitting narrower track spacing and thus greater opportunity for increasing track density on data storage discs.

The material and method used for the overmold is generally, but not limited to, plastic that is injection molded. The use of overmolds and stiffening members also maintains the benefits of reduced weight and thermal expansion of the voice coil motor armature portion.

These and various other features as well as advantages which characterize the present invention will be apparent from a reading of the following detailed description and a review of the associated drawings.

DETAILED DESCRIPTION

Figure 1:
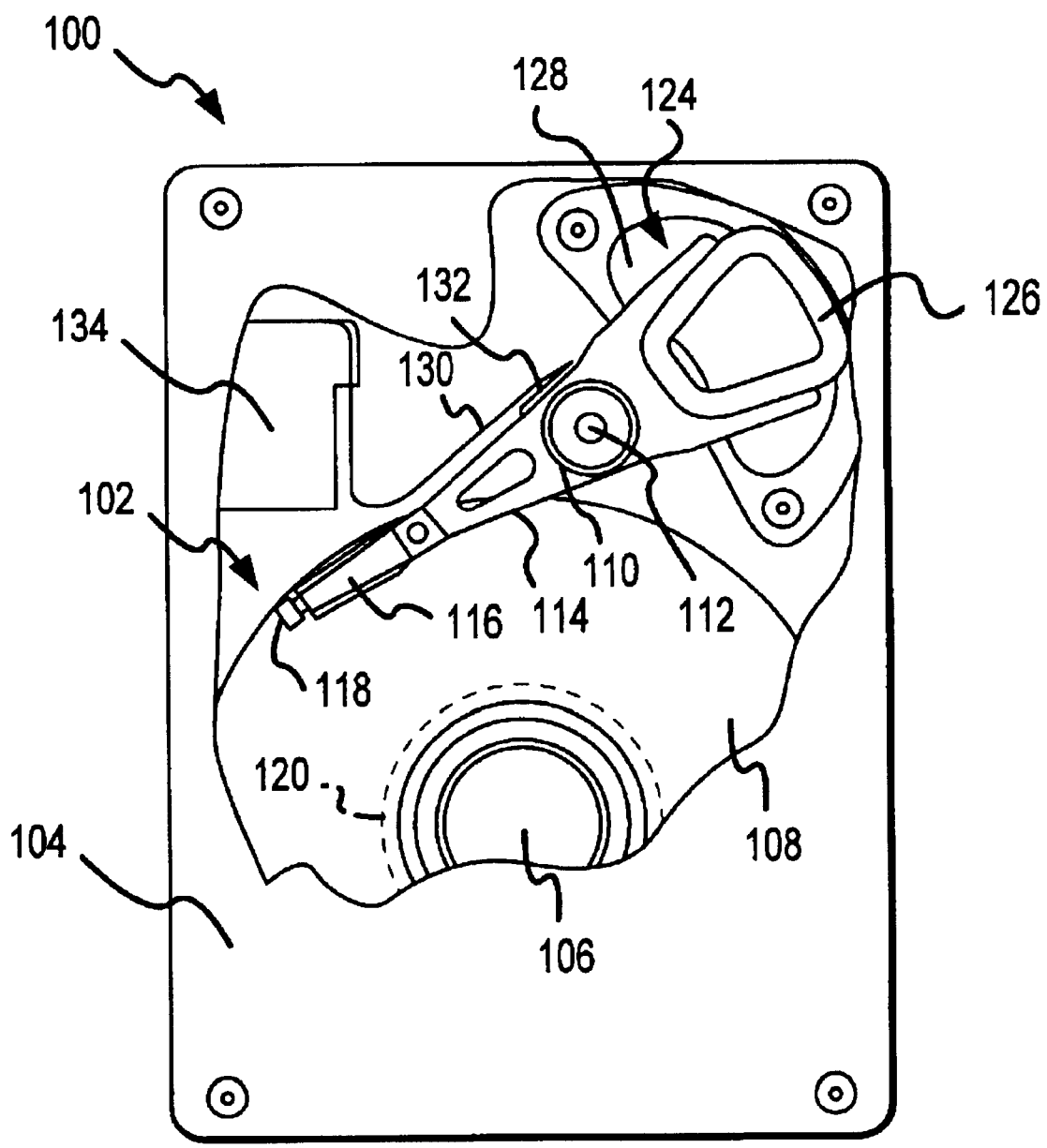
FIG. 1 is a plan view of a disc drive incorporating a preferred embodiment of the present invention showing the primary internal components.

A disc drive 100 constructed in accordance with a preferred embodiment of the present invention is shown in FIG.

1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
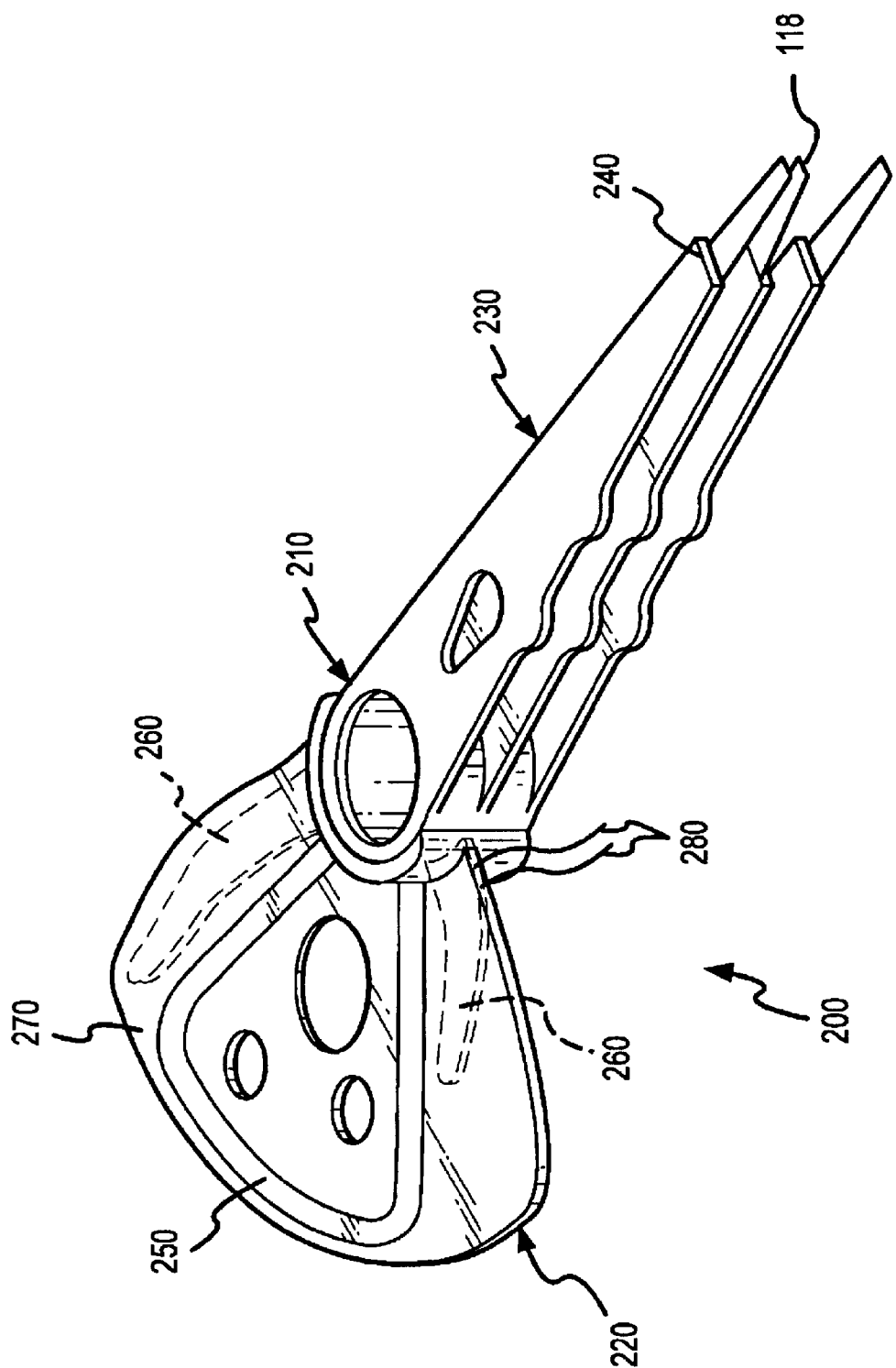
FIG. 2 is a perspective view of an actuator assembly with stiffening members and voice coil enclosed in the overmold in accordance with the present invention.

A separate perspective view of an actuator body 200 is shown in FIG. 2. The actuator body 200 has a pivot portion 210, an actuator arm portion 230 that extends from the pivot portion 210 in one direction, and a voice coil motor armature portion 220 that extends from the pivot portion 210 in a generally opposite direction. The actuator arm portion 230 carries ore or more read/write transducers 118 attached to a suspension extending from a distal end 240 of the actuator arm portion 230 as shown in FIG. 2. In FIG. 2, the voice coil motor armature portion 220 includes voice coil 250 sandwiched between two stiffening members 260, and enclosed by an overmold 270. The voice coil motor armature portion 220 extends from the pivot portion 210 of the actuator body 200 in a direction generally opposite from the actuator arm portion 230. The voice coil 250 is made of conductive material, for example, copper wire, that is generally coiled in a flat trapezoidal shape in the voice coil motor armature portion 220. The voice coil overmold 270 embeds and fastens the coil 250 rigidly to the stiffening members 260 and to the pivot portion 210.

In the exemplary embodiment 200 shown in FIG. 2, the voice coil 250 and the voice coil overmold 270 is affixed to actuator body 200 in substantially the same plane as the stiffening members 260. The voice coil overmold 270, encases the stiffening members 260 with voice coil 250 to make up voice coil armature portion 220. The overmold 270 may also cover electrical leads 280 for voice coil motor control signals. The voice coil overmold 270 is typically a plastic material, but may be varied with applications by a skilled artisan. The voice coil material may also be varied in actuator assembly coverage, for example, by encasing the pivot portion 210 or other portions of the actuator body 200.

During the positioning of heads, the voice coil motor armature portion 220 is rotated to move actuator body 200 about pivoting portion 210. In the present invention, the voice coil motor armature portion 220 provides increased rigidity to the body 200 by incorporating stiffening members 260 into the overmold 270. This enhanced rigidity minimizes low frequency, high amplitude resonances in the actuator that would otherwise occur during drive operation. This enhanced rigidity also improves the accuracy with which the heads can be positioned thereby providing greater opportunity for increasing track density for data storage discs.

Figure 3:
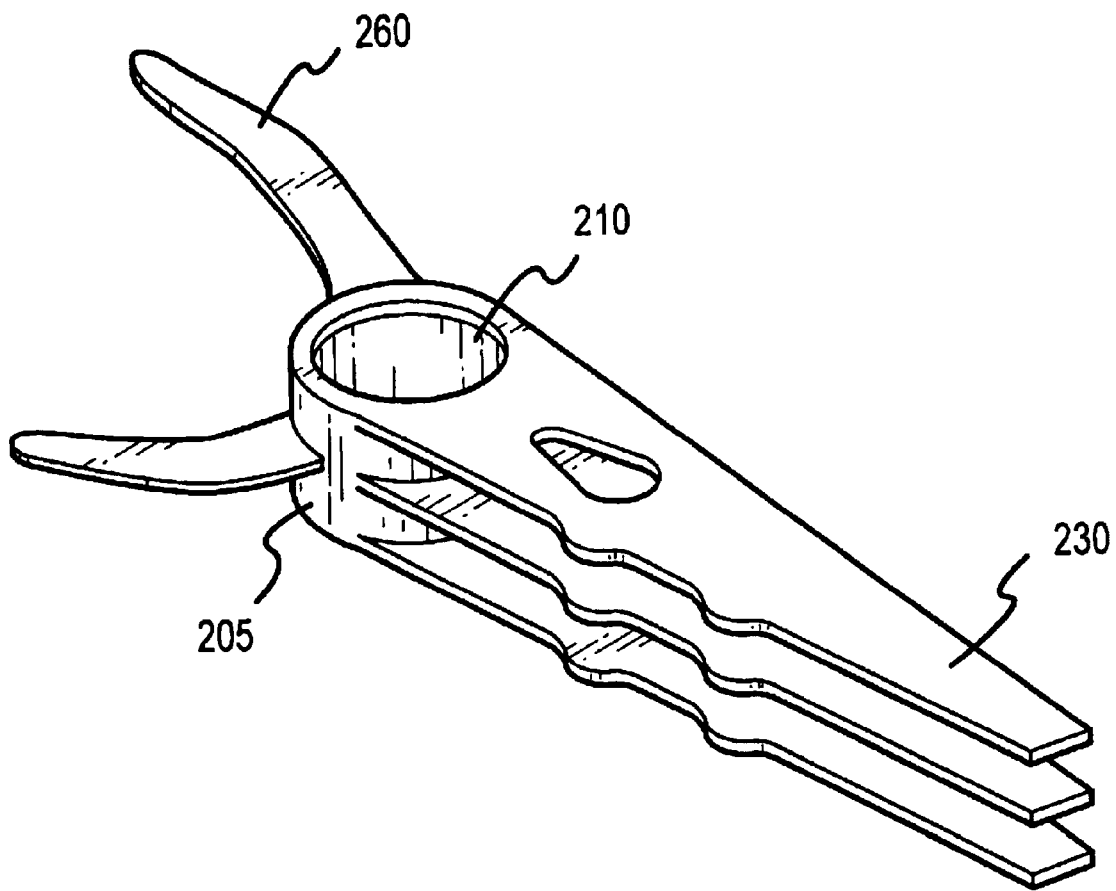
FIG. 3 is a separate perspective view of an actuator body having spaced stiffening members in accordance with the present invention.

Referring to FIG. 3, a perspective view of an actuator body 205 without the overmold 270 in place, shows stiffening member 260 without the voice coil 250 installed. Stiffening member 260 may be made up of symmetric or asymmetric members that support the voice coil 250. These stiffening members 260 are encased with overmold material during assembly. Stiffening members 260 provide strength and additional rigidity to the actuator assembly during operation. Stiffening members 260 may be varied in shape and size to support voice coil motor armature portion design objectives. Stiffening members 260 may be manufactured a number of various ways; by extrusion, die-cast molding, machining once molded and/or extruded, or alternately by independently manufacturing which would require affixing the stiffening members to the actuator body during assembly. This invention results from the realization that structurally inferior actuator assemblies created problems with low frequency-high amplitude resonances, which created further limitations in disc drive units. These problems are solved with the present invention by providing increased rigidity in the actuator body 205 through the utilization of stiffening members 260 coupled with a voice coil motor overmold 270 to eliminate such undesirable resonances created by inferior actuator assemblies.

Figure 4:
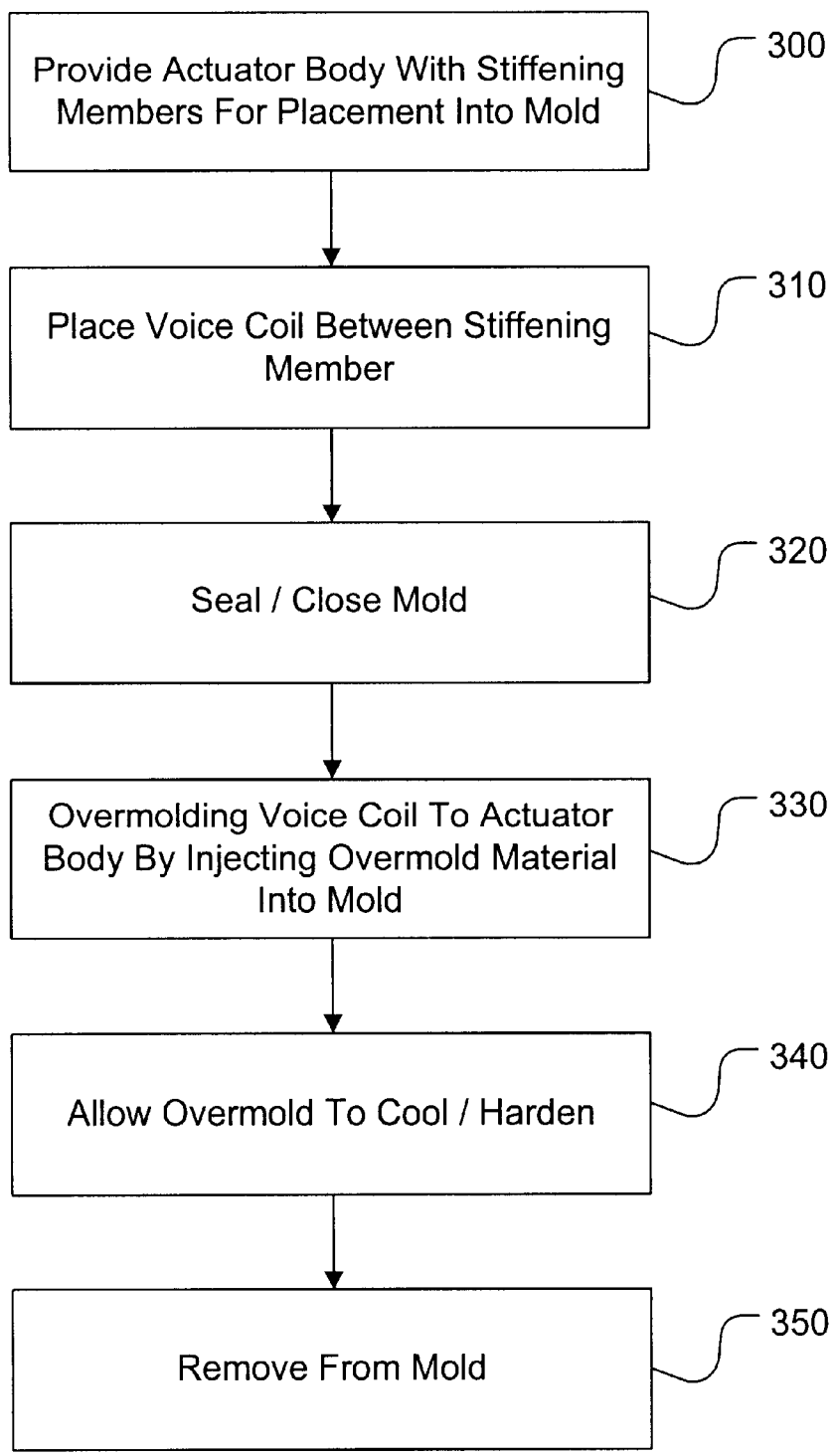
FIG. 4 is a process flow block diagram of the method for stiffening an actuator assembly in accordance with the present invention.

FIG. 4 illustrates operations for stiffening an actuator assembly in an embodiment of the present invention. Operation 300 provides an actuator body that has a stiffening member that extends from the pivot portion of the actuator body in a direction generally opposite of the actuator armature portion, which is to be placed into a mold. In alternate embodiments, stiffening members may be machined, die-cast molded, or independently manufactured which would require affixing the stiffening members to the actuator body. Operation 310 places a voice coil adjacent to the stiffening members, which may be temporarily supported by molding techniques known to a skilled artisan. Operation 320 seals the mold for typical molding processes. Operation 330 overmolds the voice coil to actuator body, generally by an injection molding technique. During this operation the stiffening member is also overmolded, which enhances the rigidity of the actuator body. The portion of overmolding may be varied to fully enclose the stiffening members, as well portions of the actuator body such as the pivot portion. Overmolding techniques may also include, but are not limited to, overmolding electrical leads for voice coil motor control signals. Operation 340 allows the overmold to cure or harden by natural or assisted cooling techniques. Upon completion of operation 340, operation 350 removes the stiffened actuator body from the mold for later use in disc drives.

In summary the invention may be viewed as an actuator assembly (such as 110) for use in a disc drive (such as 100) to read data from and write data to a data storage disc (such as 108). The actuator assembly (such as 110) has an actuator body (such as 200 or 205) having a pivoting portion (such as 210), a voice coil motor armature portion (such as 220), and an actuator arm portion (such as 230) extending from the pivot portion (such as 210). The actuator arm portion (such as 230) carries a read/write transducer (such as 118) at a distal end of the actuator arm portion (such as 230), and the voice coil motor armature portion (such as 220) has a stiffening member (such as 260) that extends from the pivot portion (such as 210) in a direction generally opposite the actuator arm portion (such as 230). An overmold (such as 270) partially encloses the stiffening member (such as 260). The voice coil (such as 250) is also carried by and embedded in the overmold (such as 270).

Alternately, the overmold (such as 270) may also enclose a portion of the pivot portion (such as 210) of the actuator body (such as 200 or 205). The stiffening members (such as 260) may also be fully enclosed within the overmold (such as 270). Similarly, the overmold (such as 260) may also cover electrical lead wires (such as 280) for the voice coil (such as 250).

The actuator body (such as 200 or 205) may also be configured and arranged to have two stiffening members (such as 260) sandwiching the voice coil (such as 250) between the stiffening members (such as 260). The stiffening members (such as 260) may also be configured and arranged to lie in a common plane.

Stated another way, the present invention may be viewed as an overmolded, stabilized actuator body (such as 200 or 205) for use in an actuator assembly (such as 110) for use in reading/writing data to media, wherein low frequency, high amplitude resonance and lateral movement about a pivoting point are minimized. The actuator body (such as 200 or 205) has a pivoting portion (such as 210), an actuator arm (such as 114) projecting from the pivoting portion (such as 210), and a stiffening member (such as 260) that extends from the pivoting portion (such as 210) in a direction generally opposite the actuator arm (such as 114). A transducer (such as 118) is generally flexibly mounted to the distal ends of the actuator arm (such as 114) for reading/writing digital data. The actuator body (such as 200 or 205) also has a voice coil motor (such as 124) and a coil (such as 126) for controlling the actuator body's rotational movement and transducer (such as 118) positioning. The overmold (such as 270) encases the stiffening member (such as 260) and mountably fastens the voice coil (such as 250) to the actuator body.

The actuator assembly (such as 110) has an overmold (such as 270) encloses a portion of the pivot portion (such as 210) of the actuator body (such as 200 or 205). The actuator body (such as 200 or 205) may also include two stiffening members (such as 260) that lie on a common plane in a direction generally opposite the actuator arm (such as 114). A voice coil (such as 250) may be mounted between the two stiffening members (such as 260) with an overmold (such as 270). Stiffening members (such as 260) may be partially encased-with the overmold (such as 270). The overmold (such as 270) provides electrical contacts for a plurality of actuator and voice coil motor control signals.

The present invention may also be viewed as a method for stiffening an actuator assembly which includes the operation of providing an elongated actuator body (such as in operation 300) which has a pivot portion (such as 210), an actuator arm (such as 114) projecting from the pivoting portion (such as 210) in a first direction, and a stiffening member (such as 260) extending in a second direction from the pivoting portion (such as 210). The method further includes the operation of placing a voice coil adjacent the stiffening member (such as in operation 310) and overmolding and enclosing (such as in operations 310–340) the stiffening member (such as 260), voice coil (such as 250), and the actuator body (such as 200 or 205).

The operation of providing the actuator body may also include the procedure of making the stiffening members (such as 260) independent of the actuator body (such as 200 or 205), and affixing the stiffening members (such as 260) to the actuator body (such as 200 or 205) opposite of the actuator arm (such as 114). Alternately, the operation of overmnolding and enclosing (such as in operations 310–340) the stiffening member (such as 260), voice coil (such as 250), and the actuator body (such as 200 or 205) may be performed by injection molding (such as in operations 320–340).

As stated in yet another way, the present invention may be viewed as a method for stabilizing and eliminating low frequency, high amplitude resonance in an actuator assembly (such as in operations 300–350) by providing an actuator body (such as 200 or 205 and as in operation 300) that has a pivot portion (such as 210), a voice coil motor armature portion (such as 220), and an actuator arm (such as 114) projecting from the pivoting portion (such as 210). The voice coil motor armature portion (such as 220) has a stiffening member that extends from the pivoting portion (such as 210) in a direction generally opposite of the actuator arm (such as 114). The method further includes the operation of securing a voice coil to the actuator body opposite the plurality of actuator armatures (such as in operations 310–340). The securing operation also includes supporting the voice coil (such as in operation 310) by the stiffening member (such as 260), and affixing the voice coil (such as 250) to the actuator body (such as 200 or 205) and the stiffening members with an overmold (such as in operations 310–340).

The operation of providing the actuator body (such as 200 or 205) may also be performed by making the stiffening members (such as 260) independent of the actuator body (such as 200 or 205) and bonding the stiffening members (such as 260) to the actuator body (such as 200 or 205) opposite of the actuator armatures (such as 114). These securing and affixing operations may be performed by injection molding (such as in operations 320–340).

It will be clear that the present invention is well adapted to attain the ends and advantages mentioned as well as those inherent therein. While a presently preferred embodiment has been described for purposes of this disclosure, various changes and modifications may be made which are well within the scope of the present invention.

Numerous other changes may be made which will readily suggest themselves to those skilled in the art and which are encompassed in the spirit of the invention disclosed and as defined in the appended claims.

What is claimed is:

1. An actuator assembly for use in a disc drive to read data from and write data to a data storage disc, the actuator assembly comprising:
   a pivot portion;
   an actuator arm portion extending from the pivot portion;
   a voice coil motor armature portion extending from the pivot portion in a direction generally opposite the actuator arm portion, the voice coil motor armature portion including an overmold surrounding a voice coil and a portion of the pivot portion to attach the voice coil to the pivot portion; and
   a metal stiffening member extending from the pivot portion adjacent the voice coil, the metal stiffening member fully embedded in the overmold to increase the rigidity of the voice coil motor armature portion.

2. The actuator assembly of claim 1, further comprising a second metal stiffening member fully embedded in the overmold adjacent the voice coil, wherein the two metal stiffening members extend on opposite sides of the voice coil to sandwich the voice coil therebetween.

3. The actuator assembly of claim 2, wherein the two metal stiffening members lie in a common plane with the voice coil.

4. The actuator assembly of claim 3, wherein the two metal stiffening members are positioned symmetrically about the voice coil.

5. The actuator assembly of claim 3, wherein the two metal stiffening members are positioned asymmetrically about the voice coil.

6. The actuator assembly of claim 3, wherein the two metal stiffening members are formed integrally with the pivot portion.

7. The actuator assembly of claim 3, wherein the two metal stiffening members are formed independently from the pivot portion and are attached to the pivot portion substantially opposite the actuator arm portion.

8. A disc drive having a spindle motor for rotating a data storage disc and an actuator assembly for moving a read/write transducer over a surface of the data storage disc, the actuator assembly comprising:
   a pivot portion;
   an actuator arm portion extending from the pivot portion and including a suspension at a distal end of the actuator arm portion to suspend the read/write transducer above the rotating data storage disc;
   a voice coil motor armature portion extending from the pivot portion in a direction generally opposite the actuator arm portion, the voice coil motor armature portion including an overmold surrounding a voice coil and a portion of the pivot portion to attach the voice coil to the pivot portion; and
   a metal stiffening member extending from the pivot portion adjacent the voice coil, the metal stiffening member fully embedded in the overmold to increase the rigidity of the voice coil motor armature portion.

9. The disc drive of claim 8, wherein the actuator assembly further comprises a second metal stiffening member fully embedded in the overmold adjacent the voice coil, wherein the two metal stiffening members extend on opposite sides of the voice coil to sandwich the voice coil therebetween.

10. The disc drive of claim 9, wherein the two metal stiffening members lie in a common plane with the voice coil.

11. The disc drive of claim 10, wherein the two metal stiffening members are positioned symmetrically about the voice coil.

12. The disc drive of claim 10, wherein the two metal stiffening members are positioned asymmetrically about the voice coil.

13. The disc drive of claim 10, wherein the two metal stiffening members are formed integrally with the pivot portion.

14. The disc drive of claim 10, wherein the two metal stiffening members are formed independently from the pivot portion and are attached to the pivot portion substantially opposite the actuator arm portion.

15. An actuator assembly for use in a disc drive to read data from and write data to a data storage disc, the actuator assembly comprising:
   an actuator body having a pivoting portion, a voice coil motor armature portion, and an actuator arm portion extending from the pivot portion, and
   means for stiffening the voice coil motor armature portion to minimize resonances.

* * * * *